US010943041B2

(12) United States Patent
Ventroux et al.

(10) Patent No.: US 10,943,041 B2
(45) Date of Patent: Mar. 9, 2021

(54) ELECTRONIC SYSTEM LEVEL PARALLEL SIMULATION METHOD WITH DETECTION OF CONFLICTS OF ACCESS TO A SHARED MEMORY

(71) Applicant: COMMISSARIAT A L'ENERGIE ATOMIQUE ET AUX ENERGIES ALTERNATIVES, Paris (FR)

(72) Inventors: Nicolas Ventroux, Massy (FR); Tanguy Sassolas, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 409 days.

(21) Appl. No.: 15/771,073

(22) PCT Filed: Oct. 26, 2016

(86) PCT No.: PCT/EP2016/075860
§ 371 (c)(1),
(2) Date: Apr. 25, 2018

(87) PCT Pub. No.: WO2017/076723
PCT Pub. Date: May 11, 2017

(65) Prior Publication Data
US 2019/0057173 A1 Feb. 21, 2019

(30) Foreign Application Priority Data

Nov. 4, 2015 (FR) ...................................... 1560551

(51) Int. Cl.
G06F 30/33 (2020.01)
G06F 9/52 (2006.01)
G06F 117/08 (2020.01)

(52) U.S. Cl.
CPC .............. G06F 30/33 (2020.01); G06F 9/524 (2013.01); G06F 2117/08 (2020.01)

(58) Field of Classification Search
CPC ....... G06F 30/33; G06F 9/524; G06F 2117/08
(Continued)

(56) References Cited

U.S. PATENT DOCUMENTS

2015/0058859 A1* 2/2015 Janssen ................. G06F 9/5061
718/104

FOREIGN PATENT DOCUMENTS

EP 0 438 890 A2 7/1991

OTHER PUBLICATIONS

Chen et al. "Optimized Out-of-Order Parallel Discrete Event Simulation Using Predictions", Mar. 18, 2013, IEEE, Design, Automation & Test in Europe Conf., pp. 3-8. (Year: 2013).*
(Continued)

Primary Examiner — Suzanne Lo
(74) Attorney, Agent, or Firm — BakerHostetler

(57) ABSTRACT

An electronic system-level parallel simulation method by means of a multi-core computer system, comprising the parallel evaluation of a plurality of concurrent processes of the simulation on a plurality of cores of the computer system and comprising a sub-method of detection of conflicts of access to a shared memory of a simulated electronic system, the sub-method being implemented by a simulation kernel executed by the computer system and comprises: a step of construction of an oriented graph representative of access to the shared memory by the processes evaluated by the concurrent processes; and a step of detection of loops in the graph; a loop being considered representative of a conflict of access to the shared memory. A computer program product for implementing such a method is provided.

10 Claims, 8 Drawing Sheets

(58) Field of Classification Search
USPC .......................................................... 703/21
See application file for complete search history.

(56) References Cited

OTHER PUBLICATIONS

Sen et al. "Predictive Runtime Verificaiton of Multi-Processor SoCs in SystemC", Jun. 13, 2008, DAC 2008, pp. 948-953. (Year: 2008).*

W. Chen et al., "Out-of-order Parallel Simulation for ESL Design," Date 2012.

A. Mello et al., "Parallel Simulation of SystemC TLM 2.0 Compliant MPSoC on SMP Workstations," Date 2010 EDAA.

C. Schumacher et al., "legaSCi: Legacy SystemC Model Integration into Parallel SystemC Simulators," 2013 IEEE 27th International Symposium on Parallel & Distributed Processing Workshops and PhD Forum, 2013, pp. 2188-2193.

P. Ezudheen et al., "Parallelizing SystemC kernel for fast hardware simulation on SMP machines," 2009 ACM/IEEE/SCS 23rd Workshop on Principles of Advanced and Distributed Simulation, pp. 80-87.

N. Blanc et al., "Race Analysis for SystemC using model checking," ACM Transactions on Design Automation of Electronic Systems, vol. V, No. N, May 2010, pp. 1-31.

F. Herrera et al., Extension of the SystemC kernel for simulation coverage improvement of System-Level concurrent specifications, in Forum on Specification and Design Languages (FDL), 2006, pp. 161-168.

C. Schumacher et al., "Scandal: SystemC analysis for nondeterministic anomalies," Forum on Specification and Design Languages (FDL), Vienna, Austria, 2012.

W. Chen et al., "Optimized out-of-order Parallel Discrete Event Simulation using predictions," 2013 IEEE Design, Automation & Test in Europe Conference & Exhibition (Date), Mar. 18, 2013, pp. 3-8, XP032395676.

C. Helmstetter et al., "Automatic Generation of Schedulings for Improving the Test Coverage of Systems-on-a-Chip," Formal Methods in Computer Aided Design, Nov. 1, 2006, pp. 171-178, XP031022270.

M. Moy, "Parallel Programming with SystemC for Loosely Timed Models: A Non-Intrusive Approach," Mar. 2013, pp. 9.

A. Sen et al., "Predictive run-time verification of multiprocessor SoCs in SystemC," Jan. 2008, pp. 948-953.

H.M. Le et al., "Towards Verifying Determinism of SystemC Designs," EDAA, Mar. 2014.

* cited by examiner

W1 reads A
W2 reads A
W3 reads A
W4 writes A
W5 writes A
W1 reads A
W6 writes A

ELECTRONIC SYSTEM LEVEL PARALLEL SIMULATION METHOD WITH DETECTION OF CONFLICTS OF ACCESS TO A SHARED MEMORY

CROSS-REFERENCE TO RELATED APPLICATIONS

This application is a National Stage of International patent application PCT/EP2016/075860, filed on Oct. 26, 2016, which claims priority to foreign French patent application No. FR 1560551, filed on Nov. 4, 2015, the disclosures of which are incorporated by reference in their entirety.

FIELD OF THE INVENTION

The invention relates to the field of tools and methodologies for designing systems on a chip (SoC). More specifically, it relates to the parallel implementation of high-level simulations of such systems.

BACKGROUND

A complex electronic system generally comprises a specific hardware platform and an application code intended to be run on such a platform. The design of the system requires, among other things, validating the execution of the application code on the hardware platform prior to the final design thereof. The costs of the design and fabrication phase are too great to be able to carry out multiple tests: all of the system has to be able to be validated before it is manufactured, and within the shortest possible time. Thus, high-level modeling tools have emerged that are capable of modeling the software and hardware parts of a complex system and that allow software prototyping and architectural exploration. These tools also sometimes offer the possibility of simulating the user interfaces to accompany the application development to the final product. For this, the expression "Electronic System Level" (ESL) simulations is used.

It has thus become essential, in the design phase, to be able to use these software platforms. They make it possible to simplify the development of low level software (drivers, operating system, etc.), or even to carry out architectural exploration. Architectural exploration is an optimization phase which makes it possible to define the size and the characteristics of the different elements belonging to the system, such as the size or the type of the cache memories, or even for example the size of the links of the interconnection networks. More recently, means have been added to the prototyping tools to study other parameters such as energy consumption or temperature. The possibility of having all this information very early in the design flow offers very many advantages directly impacting the competitiveness of the final product. It, for example, makes it possible to make better architectural choices in order to increase performance levels and energy efficiency, or, even more, to parallelize the different design phases in order to considerably reduce the design times.

A great majority of these software prototyping tools are based on the C/C++ simulation library and kernel called SystemC, and on its extension called Transactional Level Modeling (TLM). These two elements form part of IEEE 1666-2011 standard. The invention applies in particular to the SystemC/TLM simulations, and will be described with reference to this particular case. It can nevertheless be applied to other electronic system level simulation techniques, in particular to those using (like SystemC and TLM) a discrete event simulation (DES) kernel—that is to say considering that the state of the system evolves only in response to discrete events, instead of tracking its behavior continuously.

Outside of the initialization phases, the times of which are proportionally limited, the SystemC kernel is composed of 5 main and sequential phases: the phase of evaluation of the SystemC processes, the immediate notification phase, the update phase, the delta notification phase and the temporal notification phase. The first 3 phases form what is called a delta-cycle.

The progress of the simulation is illustrated by the flow diagram of FIG. 1.

A SystemC process is a software function or task describing the behavior of a part of a module of the system. On initialization, all the SystemC processes are executed in an arbitrary order; these processes are, in principle, concurrent, that is to say that they represent processes which, in the real component, will be executed in parallel. During the evaluation phase, all the processes present in a queue are evaluated. During its evaluation, each of the processes can write on output signals or ports (delta notification), notify an event to wake up other dependent processes (immediate notification) or generate a temporal event (temporal notification). An immediate notification has the effect of immediately placing the sensitive processes in the queue. The evaluation phase ends only when all the queue has been processed, and there are therefore no longer any processes ready to be evaluated. The update phase then follows. This phase consists in updating all the output signals and ports which have been modified during the different successive evaluation phases. As in any hardware description language, it is important for the states of the signals to be updated only at the end of the evaluation. In fact, all the processes are evaluated sequentially and that is the only solution guaranteeing that a read of a modified signal will return the current value and not the new value, as would happen in truly concurrent modules. At the end of the update phase, the delta notification phase begins. It consists in placing all the processes sensitive to the events linked to the delta notifications in the queue for a future evaluation. Typically, the writing of a signal will generate this type of notification and all the processes sensitive to this signal will be evaluated later. If the queue is not empty (there are still processes ready to be evaluated), the evaluation phase is relaunched together with all the other phases which devolve therefrom, and that process will be repeated until the queue is empty after the delta notification phase; this is what is called the "delta-cycle". Finally, if the simulation is not finished, the temporal notification phase takes place. It consists in verifying whether temporal notifications are present; if there are, identifying the closest temporal event, updating the current time of the simulation, checking once again whether the simulation is finished and, if not, launching a new process evaluation phase. Generally, the SystemC simulation stops when the simulation time reaches the simulation time initially requested or there is no longer any process ready to be executed at the end of the temporal notification phase.

A few years ago, the design of a system involved the implementation of a prototyping software solution capable of executing its application code and of supporting architectural exploration. One and the same model served as single platform for the software design (driver, system software, etc.) and hardware design. These simulators integrated the conventional design flow guaranteeing a unified flow from applications to hardware. That is no longer always possible, because of the growing complexity of the systems to be designed.

SUMMARY OF THE INVENTION

One solution to this problem, which is these days generally used by the manufacturers, consisting in using two distinct software platforms: one the one hand, software prototypes, such as simulator for the application development; on the other hand, hardware prototypes, for the architectural exploration, analysis and design. This separation is primarily due to the fact that the hardware prototypes have become too slow for the application development. On the other hand, a greater abstraction of the behavior of the platform or the temporal information makes it possible to significantly reduce the simulation times. Unfortunately, this approach has its limitations. In effect, with the complexity of the systems constantly increasing, it will not always be possible to improve the simulation times by reducing the precision. Moreover, the loss of information and of precision of the models used in the software development fatally introduces errors into the design flow. Some current tools try to guarantee the compatibility of the prototypes, but that is possible only on certain quite specific platforms, whose models are predesigned. This has the effect of reducing the spectrum of the solutions that can be envisaged.

Another approach consists in maintaining the unity of the platform, and in speeding up the simulations by means of an effective parallel execution of the SystemC kernel on several computation cores. This approach—which is also that of the invention—is illustrated, for example, in the documents [EZUD09], [SCHU10], [CHU14].

FIG. 2 illustrates, in a simplified manner, the progress of a parallel SystemC simulation.

After its initialization, which includes the generation and linking phases, that is to say the instantiation and the dynamic creation of the model which has to be simulated, the kernel creates a plurality of threads which, preferably, are each associated with a respective core of the computer system (logic core); the term "thread" denotes, generally, a group of processes which are evaluated sequentially. Then, the processes of the model are divided up between the threads (and therefore between the logic cores). A queue is associated with each thread, and all the processes which are ready to be evaluated are pushed into their queue. The order of the processes in each queue is arbitrary, because the result of the simulation is assumed to be independent of this order within each phase of evolution. Hereinbelow, only the case where each logic core evaluates a single thread (or no thread) will be considered; however, that is not a fundamental limitation and the invention also covers the case where at least some logic cores can evaluate several threads and the case where several logic cores evaluate one and the same thread sequentially.

Each phase of execution starts by the waking up of the threads, numbered from 0 to N, which then evaluate, in parallel, the processes of their queue. The kernel remains in wait until all the evaluations are finished.

The other steps of the simulation are conventional: the kernel checks whether immediate notifications are present and, in the affirmative, the processes woken up by these notifications are placed in the corresponding queues; then, the kernel checks whether delta notifications are present and, in the affirmative, the processes woken up by these notifications are placed in the corresponding queues. Next, unless the simulation is finished, the kernel checks whether temporal notifications are present; in the affirmative, it identifies the closest temporal event, it updates the current time of the simulation, it checks whether the simulation is finished and, in the negative, pushes the processes woken up by the temporal notifications into their queues.

A "conventional" SystemC simulation (performed sequentially by a single logic core, as in the case of FIG. 1) is deterministic. The sequential evaluation of the SystemC processes guarantees that, for given inputs and for one and the same instance of the simulator, the result will always be the same. In other words, the behavior of a SystemC simulation is reproducible. This is important for the software development and the search for errors ("debugging") when the simulator is the runtime platform, for tuning the SystemC models or even for solving concurrency condition problems. Nevertheless, SystemC possesses a certain indeterminism whose impact can prove important according to the description of the simulator. For example, the use of primitives symbolizing "mutexes" or semaphores, or the use of immediate notifications for synchronizing processes, can result in a non-deterministic behavior. In effect, as indicated above, the order of evaluation of the different processes in the evaluation phase is indeterminate (non-deterministic) and depends on the implementation of the SystemC model. This particular feature in SystemC has never been corrected by a static scheduling of the processes, because the non-determinism in SystemC has certain advantages. First of all, it allows for the modeling of non-deterministic systems as real parallel systems would be for example. Next, this makes it possible to reveal, according to the inputs of the system, modeling errors. According to the SystemC specifications, the architect using SystemC has to know at the time of design that the order of the evaluation of the processes in the evaluation phase is undetermined.

Generally, the errors linked to concurrency in the parallel software systems can be of four types. The so-called concurrency condition (data race) errors, the atomic access violations, the order violations and the inter-blockages. These phenomena can occur when two parallel processes execute a critical section non-atomically. In other words, when two parallel processes access an unprotected shared datum, and at least one write occurs. The effects range from immediate irreversible errors to the corruption of silent data potentially leading to even greater problems. A sequential SystemC simulation has the drawback, and sometimes the advantage, of concealing most of the errors linked to the concurrency and does so regardless of the type of communication used. Thus, most of these errors cannot be modeled and resolved. The designer must wait for an execution on the hardware platform to resolve the bugs linked to the concurrency. Some works in the literature propose modifying the scheduling of the processes during the evaluation phase to remedy this problem and intensively study the impact of the order of evaluation on the behavior of the system.

One drawback of the SystemC simulations is therefore that the sequential and deterministic execution leads to most of the concurrency errors being masked. These simulations do not therefore always allow for a complete validation of the system modeled. For that reason, research has been carried out to identify means for detecting and checking the determinism in the SystemC models.

[BLAN08] describes a novel SystemC compiler incorporating a static automatic checking technique (model checking). This technique consists in algorithmically checking whether a given SystemC model satisfies a specification. In [BLAN08], the check aims to improve the performance levels and detect concurrency errors.

The main limitation of this approach lies in its inability to address problems that are of great complexity, or that use dynamic allocations or pointers. Moreover, a large number of SystemC primitives cannot be supported.

[HELM06] proposes generating multiple scheduling orders in order to reveal concurrency errors. To do this, [HELM06] proposes instrumenting each access to shared variables and monitoring the reads and writes, in order to generate a graph, called "dependency graph", between the processes upon the execution of the simulator. This graph is then used to generate, via a partial order dynamic reduction technique, all of the possible schedulings likely to reveal concurrency errors. The number of possible schedulings nevertheless remains very great and this technique does not make it possible to address systems of large size.

[SEN08] proposes instrumenting the SystemC models to detect all of the dependencies during the execution of the simulator by using a vector logic time technique then formally analyzing the execution traces generated by comparing them to predetermined assertions. These traces give detailed information on the different partial orders obtained in each evaluation phase and then make it possible to detect possible inter-blockages or concurrency errors. These works do not support TLM communications.

The "test-based" approaches consist in generating several possible schedulings and in comparing the results produced to detect any problems of determinism. For example, [LE14] uses a transformation of the SystemC model into a completely static model in C; the processes then communicate with one another only via shared variables. Then, two schedulings of the processes are generated, one completely static and ordered, and the other whose order of evaluation is undetermined. The difference in result is analyzed to highlight problems of determinism. On the other hand, [HERR06] proposes generating a random scheduling and executing multiple simulation instances to detect any errors. Finally, [SCHU12a] proposes a slightly different approach by recording different observable quantities like the activation of the processes, the allocation of the stack, the standard output, the use of random numbers, etc. The successive execution of simulations by comparing these quantities allows for the detection of concurrency errors. The main drawback with these techniques lies in the need to perform several successive executions and therefore increase the simulation time.

The "primitive" parallelization of SystemC induces other difficulties linked to the concurrency. In effect, without particular precautions, such a parallelization inevitably leads to errors linked to the concurrency, and therefore to a non-deterministic behavior of the simulation. That is not compatible with the determinism demanded by SystemC. Parallelizing the SystemC simulation kernel is a difficult problem because such a parallel kernel must not generate a different behavior to a sequential implementation. Concurrency conditions (race conditions), the order and the temporal instants of activation of the processes, and the implementation of all the mechanisms previously described must be observed. The difficulty lies then in implementing such a parallelization to guarantee a high level of performance and the determinism of the simulations. This problem (how to parallelize SystemC while observing the condition of determinism) has been broached in the following publications:

[CHEN12] proposes detecting the occurrence of errors linked to the concurrency by a static analysis of the code of the SystemC processes, capable of detecting the dependencies between the processes, by essentially focusing on the transitions (that is to say on the code executed between two calls to the "wait" primitive). With this information, it is possible to define a scheduling of the processes which guarantees the non-generation of concurrency errors by sequentializing the dependent processes. Such a static approach proves very cumbersome and leads to the generation of solutions that can barely be parallelized with the use of TLM communications. In effect, all the processes accessing a memory element in TLM are executed sequentially.

[EZUD09] uses synchronization mechanisms based on the declaration of OpenMP critical sections to protect the shared variables of the kernel which have to be accessible by the SystemC processes which are evaluated in parallel. These techniques prohibit the use of shared variables or use particular synchronizations to access them, requiring the user to guarantee the atomicity of the memory accesses and of the communications.

[MELL10] exploits the fact that the ESL simulations are generally discrete event simulations and, consequently, do not use a clock, to authorize, in the context of a speculative approach, certain violations of temporal order of execution by the addition of certain logic mechanisms. The SystemC processes have a local time which is synchronized with the other events of the system on each communication or each time a predefined time threshold (also called quantum) is reached. Thus, the temporal order violation cannot exceed the duration of a quantum and the synchronization constraint, penalizing for the performance levels, is relaxed. This entails greatly constraining the description of the model and prohibits certain uses of SystemC. This approach cannot therefore be used generally and above all is very costly because of the use of speculation mechanisms.

[MOY13] also proposes not strictly observing the temporal scheduling of the SystemC processes and using a particular library to declare the processing operations of the dependent processes, greatly constraining how the models are described in SystemC. Each processing operation in a process is associated with an execution time. A static analysis then makes it possible to define a total order of the processing operations and define which will be able to be executed in parallel without risk of conflict. This mechanism works only if the dependent processes can be desynchronized and cannot be generalized in the case of TLM simulations in which all of the processes may have to randomly access a shared resource like the memory.

[SCHU13] proposes mechanisms for resolving the access conflicts of the parallel and dependent processes and guaranteeing the atomicity of these simulations. The simulations based on communications using the TLM 2.0 extension are here supported. The first mechanism consists in creating groups of processes which will then be evaluated on independent threads. When a process wants to communicate with another process belonging to another group, then the former is migrated dynamically with its context to the other group. This is done during the evaluation phase and guarantees the atomicity of the execution of the different processes. All the communications must then pass through the TLM interfaces. With regard to the direct communications via global or static variables, particular manual precautions must be taken by the designer if processes of different groups can have access thereto. All the modules of a group can access functions that are members of other modules of the same group. In order to allow the predictability and the determinism of the simulations, an ordered thread is used for each of the groups. This guarantees that the dependent processes are always executed in the same order in each evaluation phase. The major drawback of this approach lies in the migration of the processes to other threads. Moreover, often in a SystemC simulation, the target of a transaction is not a SystemC process but a simple function and it is not therefore possible with this method to guarantee the atomicity of its accesses. Finally, the integration of dependent processes in a same group limits the possible parallelization and therefore the performance levels.

In conclusion, the (conventional) sequential implementations of SystemC present the drawback of masking the concurrency errors, whereas the parallel implementations can reveal these errors, but at the cost of loss of determinism, which is not acceptable. Several solutions, which have just been explained, have been proposed for mitigating these drawbacks, but none gives entire satisfaction.

The invention aims to overcome these drawbacks of the prior art. More particularly, it aims to allow electronic system-level simulations executed in parallel on a multi-core computer system, that observe the condition of determinism while revealing the situations likely to lead to concurrency errors.

In accordance with the invention, this objective is achieved by virtue of the construction, during the parallel execution of an electronic system-level simulation, of a dependency graph and its dynamic exploitation to detect errors of determinism/of atomicity or to deterministically "replay" a preceding execution of the simulation.

According to different embodiments, the invention exploits the dynamic creation of dependency graphs defining a partial order between the processes running in parallel during an evaluation phase, the generation of an ordered list of processes to be executed sequentially in the same evaluation phase and the use of the ordered list to sequentially schedule the processes accessing memory zones that have to be atomic. The use of these graphs makes it possible to check the properties of atomicity of the evaluation phase through the complementary use of an algorithm searching for strongly connected components. In case of detection of a concurrency error, it is then possible to envisage turning back and re-executing the evaluation phase according to a partially sequential order (that is however difficult to put in place), or modifying the model to prevent the effect of interleaving of the processes. Finally, the saving of all the graphs after their serialization can allow for a subsequent use in order to reproduce the same order of evaluation of the processes within each evaluation phase and obtain a deterministic and predictable model for the debugging.

One object of the invention is therefore an electronic system-level parallel simulation method implemented by means of a multi-core computer system, said method comprising the parallel evaluation of a plurality of concurrent processes of said simulation on a plurality of logic cores of said computer system, said concurrent processes being grouped together in threads, the concurrent processes of a same thread being evaluated sequentially by a same logic core of the system, the method being characterized in that it comprises a sub-method of detection of conflicts of access to a shared memory of a simulated electronic system, said sub-method being implemented by a simulation kernel executed by said computer system and comprising: a step of construction of an oriented graph representative of access to said shared memory by the processes evaluated by said concurrent processes; and a step of detection of loops in said graph; a loop being considered representative of a conflict of access to said shared memory.

According to particular embodiments of the invention:

said orientated graph can comprise nodes, each representing a thread, and arcs each linking two nodes, each arc representing a relationship of order of execution between the two said threads (that is to say between at least one process of each of the two threads).

The method can comprise a plurality of concurrent process evaluation phases corresponding to successive simulation times, in which said steps of the sub-method of detection of conflicts of access are implemented after each said evaluation phase.

The method can also comprise: in said parallel evaluation of a plurality of concurrent processes, a step of monitoring of at least one zone of said shared memory of the simulated electronic system previously declared as critical, and of preemption of all the processes belonging to a same thread as a process having tried to access said or each said zone after a first access by another process belonging to another thread; and after said parallel evaluation, a step of sequential evaluation of the processes preempted in the preceding step.

Said step of construction of an oriented graph can comprise: the construction of a plurality of partial oriented graphs, each representative of access to a subset of said shared memory; and the merging of these graphs to form a single oriented graph. In this case, an if said shared memory of the simulated electronic system comprises a plurality of memory locations grouped together in a plurality of pages, said construction of a plurality of partial oriented graphs can comprise: the construction of a plurality of partial oriented graphs, each representative of access to a respective memory location; the merging of the partial orientated graphs corresponding to the memory locations of a same page. Moreover, the construction of each said partial oriented graph can comprise: on each read mode access to said subset of the shared memory, the identification and the memorizing of an identifier of the thread whose process has performed said read mode access; on each write mode access, the creation:

of a node, called current node, representing the thread whose process has performed said write mode access;

of nodes, called preceding reading nodes, representing threads of which at least one process has performed a read mode access to said subset of the shared memory before said write mode access but after a possible preceding write mode access, if at least one such thread exists;

of orientated arcs each linking said preceding reading node to said current node, if at least one such node exists; and if the write mode access is not the first:

of oriented arcs linking a node, called preceding writing node, representing the thread of which a process has performed the immediately preceding write mode access to said preceding reading nodes, if at least one such node exists;

or of an arc linking said writing node to said current node if no said preceding reading node exists.

In this case, the memorizing of the identifier of the thread of which a process has performed said read mode access can be performed by means of at least one vector associated with each thread, each said vector comprising as many Boolean elements as there are subsets of said shared memory, each element: being associated with one said subset, having a first default binary value and taking a second binary value, opposite the preceding one, when a process belonging to said thread performs an access to the subset of said shared memory associated with said element.

Said sub-method of detection of conflicts of access can also comprise, if no conflict is detected, a step of determination of an ordered first list of threads that have to be evaluated sequentially, and of a second list of threads that can be evaluated in parallel, this step being implemented by linearization of said oriented graph. In this case, the method can also comprise a repeat execution of said simulation, said repeat execution comprising: a phase of parallel evaluation of the threads belonging to said second list; and a phase of sequential evaluation of the threads belonging to said first list.

Another subject of the invention is a computer program product comprising computer-executable computer code, stored on a computer-readable medium (preferably nonvolatile) and suitable for implementing such a method.

BRIEF DESCRIPTION OF THE DRAWINGS

Other features, details and advantages of the invention will emerge on reading the description given with reference to the attached drawings given by way of example and which represent, respectively.

DETAILED DESCRIPTION

As has been mentioned above, the invention aims in particular to detect the problems of parallel accesses to shared resources, which can occur in the execution of a parallel simulation, to force the sequential execution of the strongly dependent processes to guarantee the atomicity of their evaluation, and/or to render a simulation totally predictable to allow the search for bugs and the tuning of the simulator and of the applications through the re-use of the total order of a prior execution.

To do this, a method according to the invention dynamically creates a dependency graph between the processes for each address used and in each evaluation phase. This is done in order to check that the SystemC processes, although evaluated in parallel, are evaluated in a partial order with respect to all of these addresses. The structure of the graph is made up of nodes whose value corresponds to the identifier of a thread, and of oriented arcs linking these nodes. Each arc corresponds to an order of execution between the nodes. A graph is not created if no write occurs since there cannot be any concurrency error if all the accesses are in read mode, but all the reads are registered in the case where a write would occur before the end of the evaluation phase. Thus, a new node is created on each new write or on each new read if a write has already taken place. Upon each new write, the graph is also extended with all of the preceding reads. This graph makes it possible to detect all the non-commutative actions on all the variables and spaces shared in the model which can lead to conflicts of atomicity of the evaluation of the processes. Thus, it is important to detect a read or a write if it is followed by a modifying write, and a modifying write if it is followed by a read.

Figure 3A:
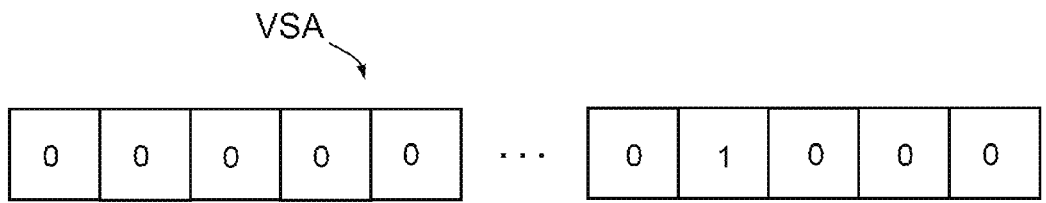
FIGS. 3A to 3E, respectively, one possible implementation of a data structure for memorizing the read mode accesses, the construction of a dependency graph, one possible implementation of the graph, the detection of loops and an example of linearization of such a graph.

The read mode accesses are the more numerous, so it is important for the monitoring thereof to be as effective as possible. One technique for monitoring read mode accesses is illustrated in FIG. 3A. A set of vectors VSA, for example of 64 elements, is associated with each thread, and therefore with each logic core. The elements of each vector are binary, or Boolean, and can therefore be composed of a single bit, each representing an address of the shared memory; thus, a simple 64-bit word represents 64 addresses. Techniques for changing the resolution can increase the size of this range; in this case, each element of the vector represents a group of memory addresses. Initially, each element of each vector has a same binary value, for example "0". When a process accesses an address of a memory in read mode, the corresponding element of the vector VSA associated with the thread which executes the process takes the opposite value, here "1". That makes it possible to easily find, for each address, or set of addresses, of the shared memory, the threads of which at least one process has accessed the latter in read mode.

Figure 4:
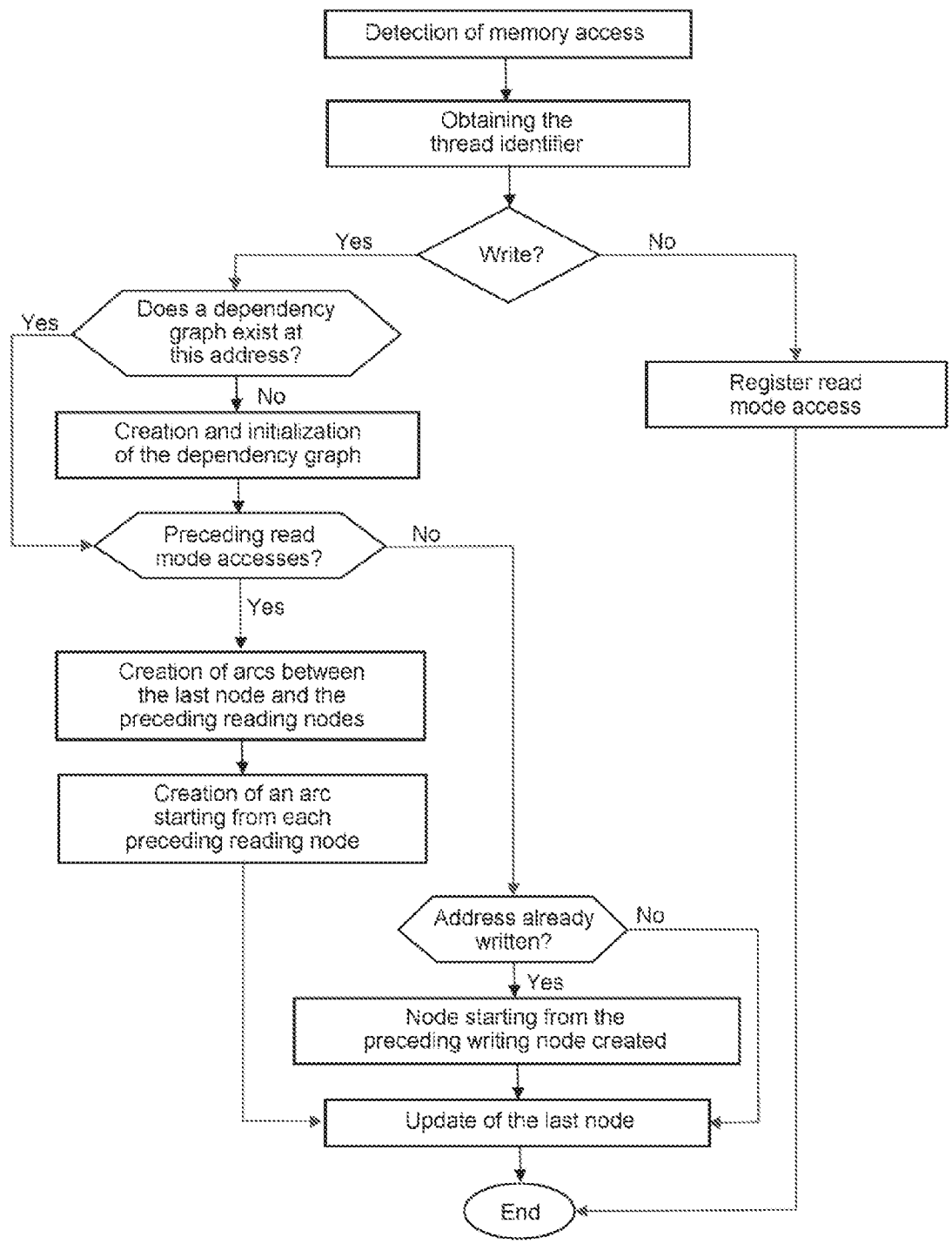
FIG. 4, a flow diagram of the step of creation of a dependency graph.

The process for creating the graph, implemented by the simulation kernel, is as follows; this process is illustrated by the flow diagram of FIG. 4.

When an access to a memory location is detected, the identifier of the thread originating from the access is recovered; then, it is checked to see if it is a write mode or read mode access. If it is a read, the latter is saved in the corresponding read vector VSA. Otherwise, there is a check to see if the graph exists already and a new graph is created dynamically if necessary. Next, there is a check to see if there have been reads previously at this address. If yes, then the identifiers of the threads, and therefore of the logic cores, having accessed this address in read mode are used for the creation of new nodes ("reading nodes") in the graph. The arcs are created between the last write mode node created and these new reading nodes, then between these reading nodes and a new node representing the write mode access present. If not, there is a test to see if a write has taken place previously and an arc is created with the last node. Finally, the last node added is updated with the identifier of the current thread. At the end of the parallel evaluation phase, this graph is finalized. Nodes representing all the threads of which a process has read a given address are added to the end of the graph if the latter is not empty. Before the start of the successive parallel evaluation phase, the dependency graphs and the read vectors VSA are reinitialized.

Figure 3B:
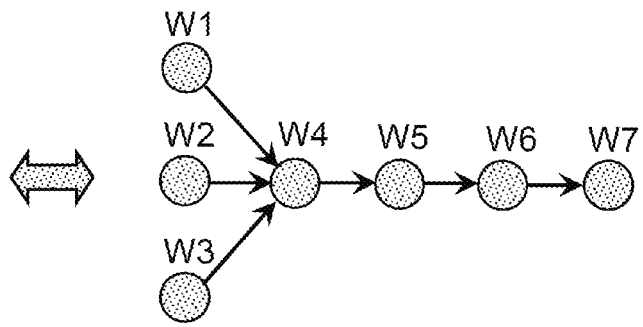

FIG. 3B illustrates the creation of a dependency graph GD for an address "A" corresponding to the following memory access succession:

a process of the thread W1 ("W" for "worker") accesses the memory element A in read mode, a process of the thread W2 accesses A in read mode, a process of the thread W3 accesses A in read mode,
a process of the thread W4 accesses A in write mode,
a process of the thread W5 accesses A in write mode,
a process of the thread W6 accessing A in read mode,
a process of the thread W6 accesses A in write mode,
a process of the thread W7 accesses A in read mode.

Figure 3C:
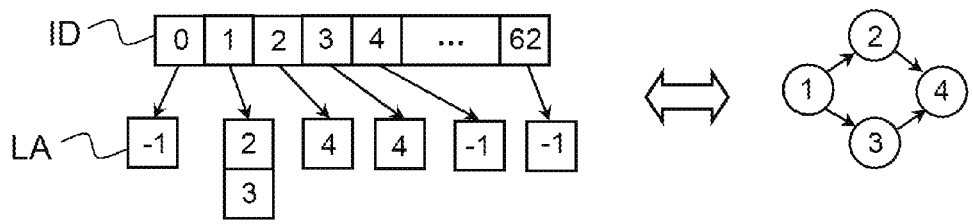

FIG. 3C illustrates a data structure that can be used to represent a dependency graph. This structure takes the form of a vector, of the size of the number of nodes of the graph, whose elements ID are, or point to, lists LA of subsequent nodes.

There is a graph for each address or for each group of addresses which are processed unitarily (resolution). A node has a value which corresponds to the identifier of the thread which is the origin of the memory access; the value "−1" is assigned to the elements of the vector which correspond to threads which have no successor in the graph.

At the end of each evaluation phase, all the graphs are merged to obtain a global graph representative of all the dependencies of access to the shared memory resources of the model for this evaluation phase.

Checking the absence of a conflict of atomicity amounts to checking the absence of cycles in the global dependency graph. It is then sufficient to detect whether the graph has strongly connected components. This can be done for example through the use of a Tarjan algorithm. If a conflict is detected, the simulation is stopped and the nature of the conflict is supplied to the user. With this information, the designer can correct the application which is running on the model and protect the critical sections, define the incriminated addresses as having to be accessed atomically, or for example differently allocate the processes originating from conflict of access on the logic cores so that these processes are evaluated sequentially.

In order to improve the effectiveness of the method, it may be advantageous to perform the construction of the dependency graphs and the detection of the conflicts in a hierarchical way by considering that the shared memory is formed by pages, each comprising a plurality of memory addresses. Thus, for example, it is possible first of all to detect the strongly connected components in each individual graph; then, if no conflict is detected at this level, merge the graphs corresponding to memory locations belonging to a same page and proceed with the detection of strongly connected components in these higher level graphs, finally merge all these graphs in a single global graph and perform, one last time, a detection of strongly connected components. The number of levels, in such a hierarchical approach, can, of course, be different from three.

Figure 3D:
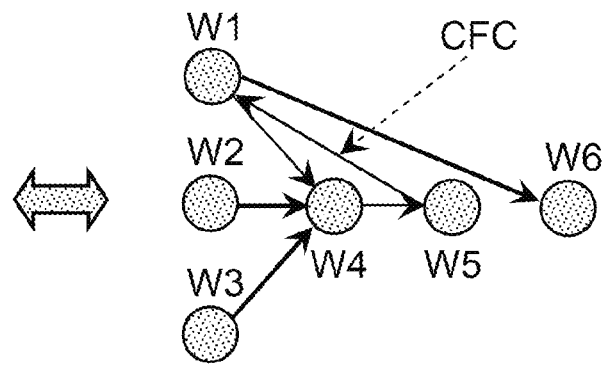

FIG. 3D shows a dependency graph GD exhibiting a strongly connected component CFC composed of the nodes W1, W4 and W5 and of the arcs which link them, which form a loop. The graph corresponds to the following memory access succession:
a process of the thread W1 accesses A in read mode,
a process of the thread W2 accesses A in read mode,
a process of the thread W3 accesses A in read mode,
a process of the thread W4 accesses A in write mode,
a process of the thread W5 accesses A in write mode,
the process of the thread W1 once again accesses A in read mode,
a process of the thread W6 accesses A in write mode.

It is easy to check that the second read mode access by W1 provokes a violation of atomicity.

Figure 3E:

If the global dependency graph is acyclical, a simple linearization can be performed in order to obtain, for each evaluation phase, the list of the threads (and therefore of the processes) that have to be executed in parallel and the ordered list of the threads that have to be executed sequentially. The serialization can be obtained via a topological graph sorting algorithm. FIG. 3E illustrates a situation where the maximum number of threads is 63 (computer system with 64 cores, one of which is devoted to executing the simulation kernel) where the threads 1 to 4 perform memory accesses which do not give rise to conflict. The corresponding graph is represented in the left part of the figure; on the right are represented:

an ordered list NS, obtained by linearization of the graph, containing the threads which have to be evaluated sequentially (note that the order indicated—1, 2, 3, 4—is not the only one possible; the order 1, 3, 2, 4 would also have been able to be chosen);

a list NP of threads (0 and 5 to 62) that can be reevaluated in parallel (a sequential execution is of course possible, in which case the order is unimportant). It should be stressed that, if the threads are evaluated in parallel by different logic cores, the processes of each thread are necessarily evaluated sequentially. The list NP contains the threads which do not belong to NS; it is therefore also obtained—indirectly—by linearization of the graph.

It will be noted also that the thread 1 could be assigned to the list NP in the case where the threads of NP will be re-evaluated before those of NS, or the thread 4 could be assigned to the list NP in the case where the threads of NP will be re-evaluated after those of NS. This solution makes it possible to increase the parallelism of in the evaluation of NP and to reduce the NS evaluation time.

These two lists, or at least the list NS, can be saved in a file, called execution file, with an indication of the corresponding time of the simulation and iteration number of the evaluation phase. This file is necessary to allow a deterministic repeated execution of the simulation, as will be explained later with reference to FIG. 7.

As stated above with reference to the vectors of monitoring read mode accesses VSA, it is possible to improve the effectiveness of the method by acting on its "granularity", that is to say by considering several memory locations as a single location, to which is assigned a single element of each vector VSA and a single dependency graph. The drawback is that "false positives" are then provoked, that is to say violations of atomicity are detected which do not in reality exist.

Figure 5:
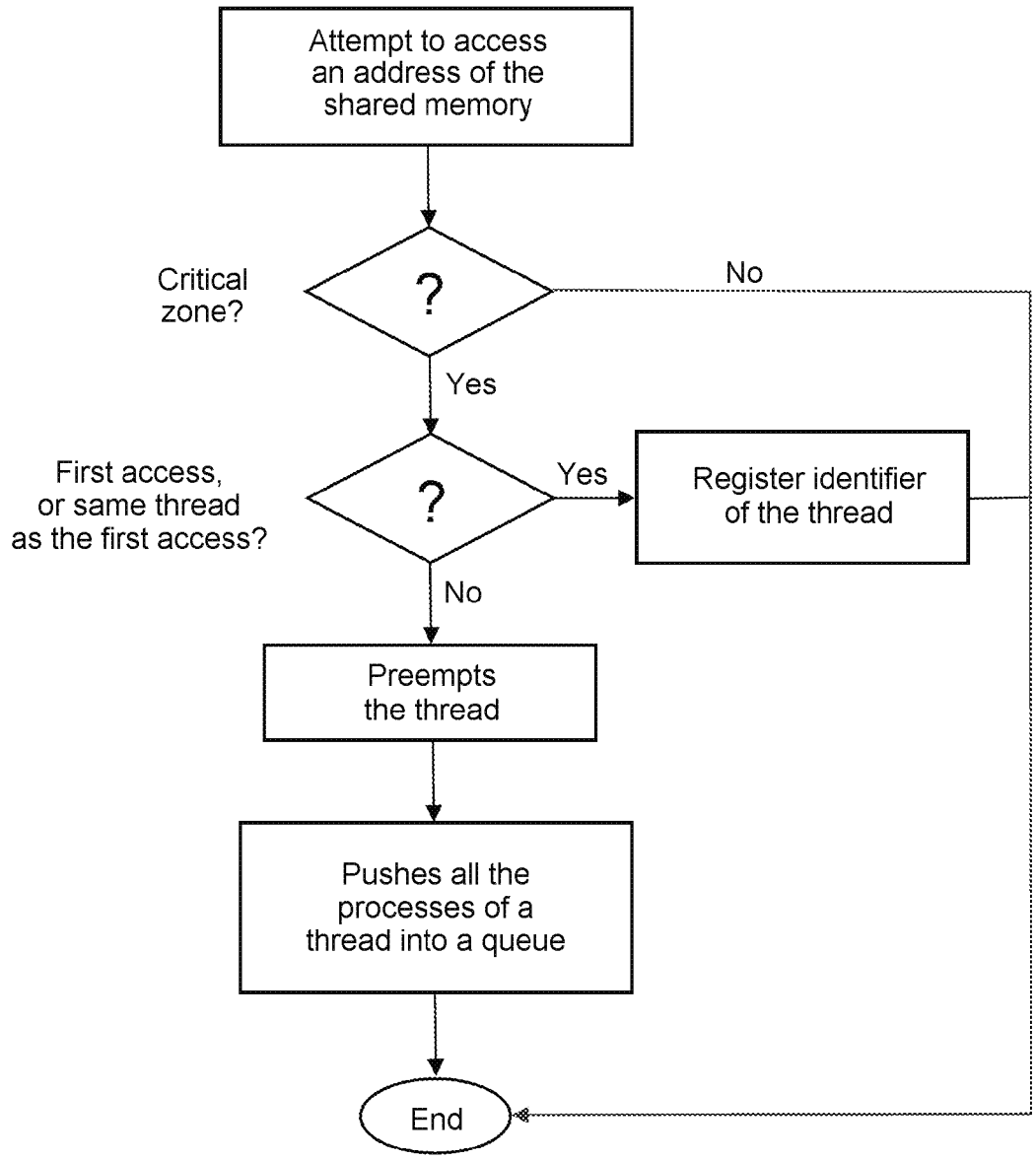
FIG. 5, a flow diagram illustrating the implementation of a mechanism for protecting critical zones of the shared memory.

According to a preferred embodiment of the invention, zones of the shared memory can be defined as being "critical", and thereby form the subject of a special monitoring in order to force the atomicity of their accesses upstream and avoid the occurrence of access conflicts, instead of being limited to detecting them after the event by means of the dependency graphs. One such monitoring mechanism is illustrated by the flow diagram of FIG. 5.

Upon any request to access an address of the shared memory, the kernel checks whether this address belongs to a critical region. In the affirmative, it checks to see if it is the first access to this address during the current evaluation phase. If it is, an identifier of the thread originating the request is saved in a data structure, and the access is authorized. The same applies for all the subsequent accesses by processes of this same thread (which is determined by virtue of the identifier saved previously), which are therefore processed as "first" accesses. In other words, all the processes belonging to the same thread as that originating the access attempt are preempted and pushed into a queue; a node corresponding to the preempted process is nevertheless created in the dependency graph. The processes contained in the queue will be executed sequentially at the end of the current evaluation phase.

Figure 1:
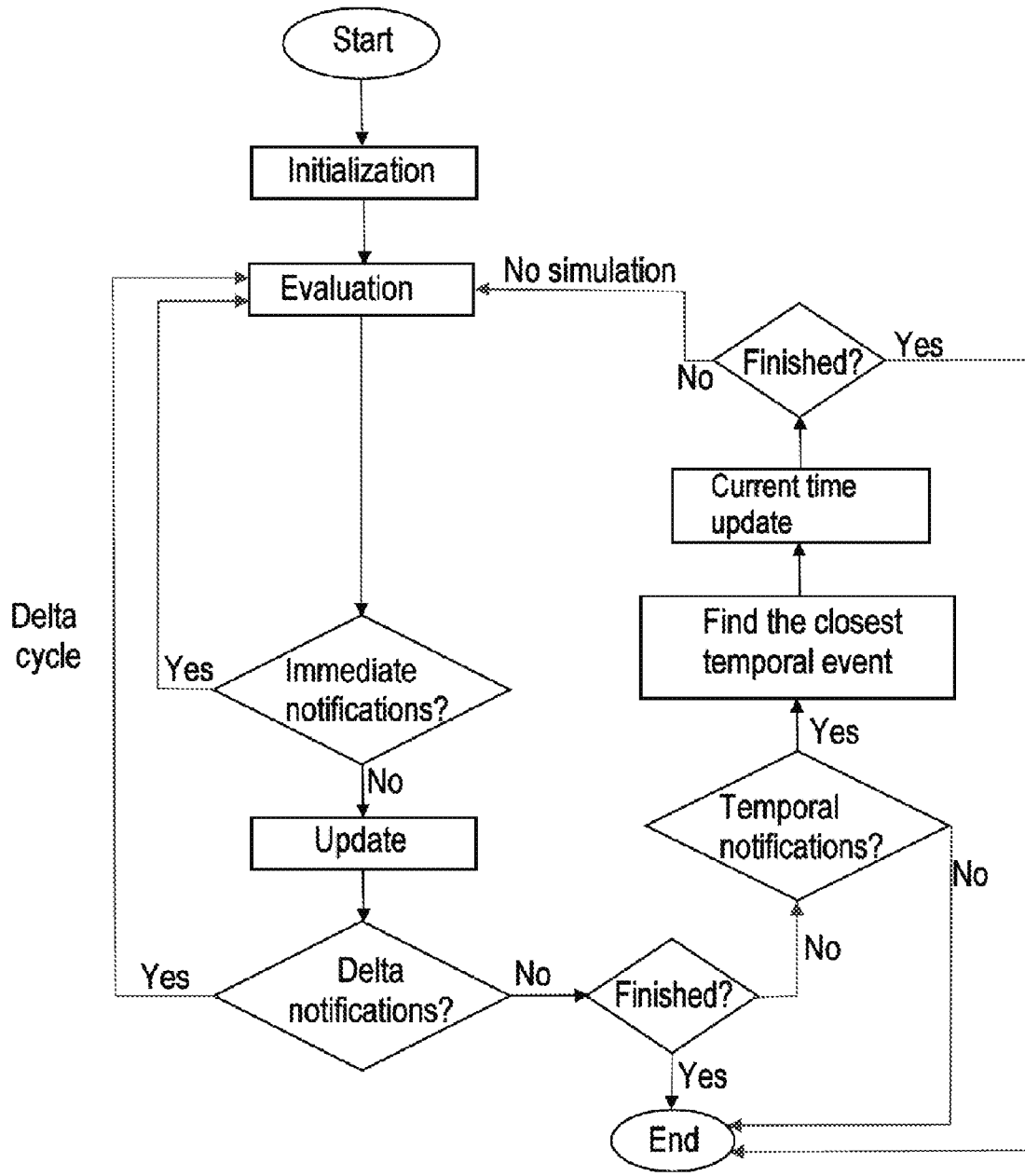
FIG. 1, a flow diagram of an electronic system-level simulation performed sequentially in SystemC, according to the prior art.
Figure 2:
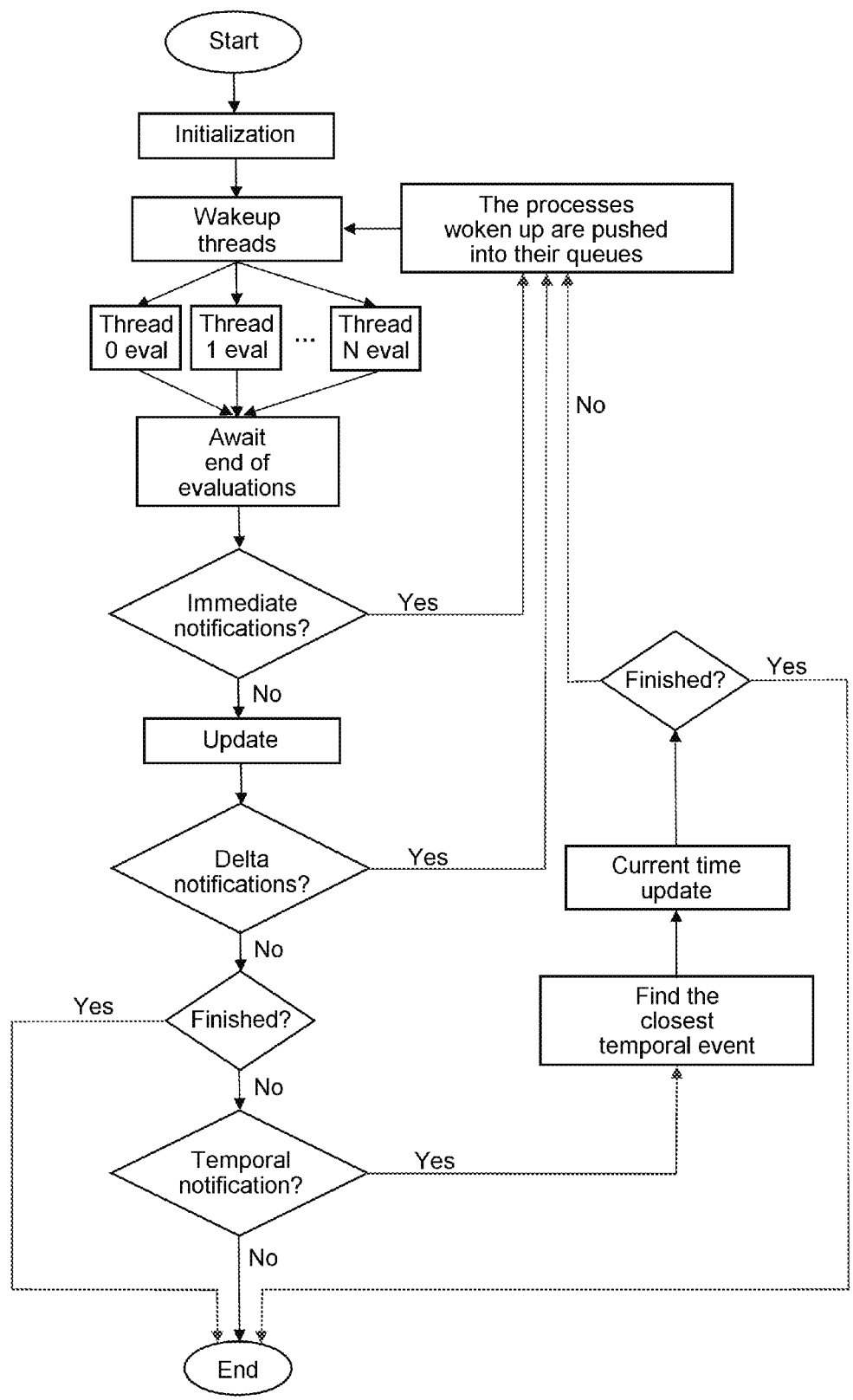
FIG. 2, a flow diagram of an electronic system-level simulation performed in parallel but without detection of access conflicts.
Figure 6:
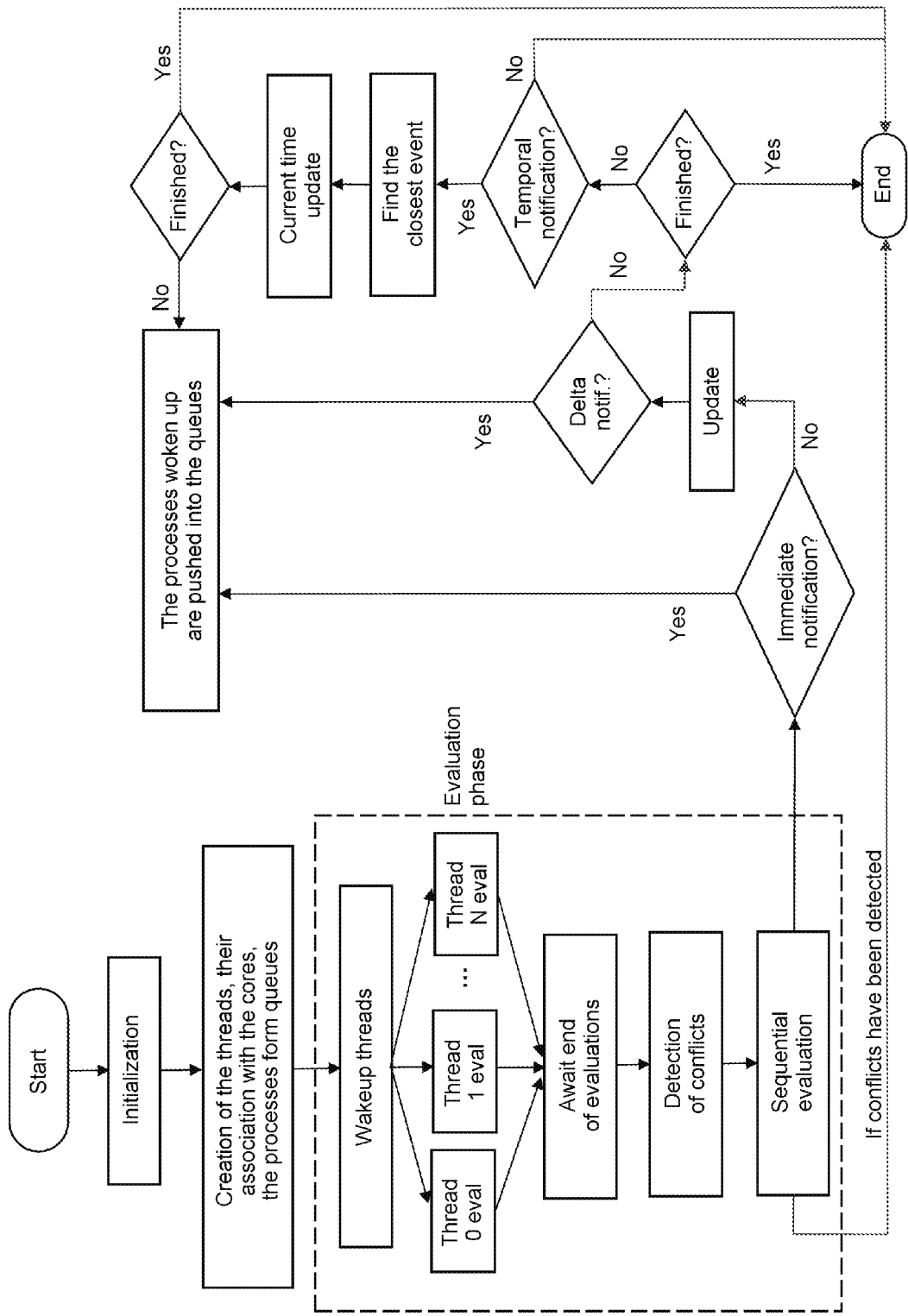
FIG. 6, a flow diagram of a method according to an embodiment of the invention.

The flow diagram of FIG. 6 illustrates, in a simplified manner, the progress of a parallel SystemC simulation according to an embodiment of the invention. This flow diagram is similar to that of FIG. 2, but includes two additional steps:

at the end of the parallel evaluation phase, the simulation kernel detects any conflicts of access to the shared memory by using the dependency graphs, and if such conflicts are detected the simulation is stopped;

if no access conflict has been detected, the kernel proceeds with the sequential evaluation of the processes which have been preempted in the parallel evaluation phase because they have requested access to an address of a critical zone of the memory to which another process had already had access. This sequential order of evaluation respects the partial order obtained by the global dependency graph obtained at the end of the parallel evaluation.

Furthermore, as described above, the dependency graphs make it possible to construct a list of the threads that can be executed in parallel and of those that have to be executed sequentially in each evaluation phase. In one embodiment, the evaluation phase is identified by the current SystemC simulation time and the number of the evaluation phase at this SystemC time. This information is saved in said execution file. No information is recorded in the file for the instants where no dependency has been observed. This file can then be used for another execution of the same model ("replay mode") in order to recreate the exact behavior and total order of scheduling of the processes. This makes it possible to guarantee the determinism of the simulations.

Figure 7:
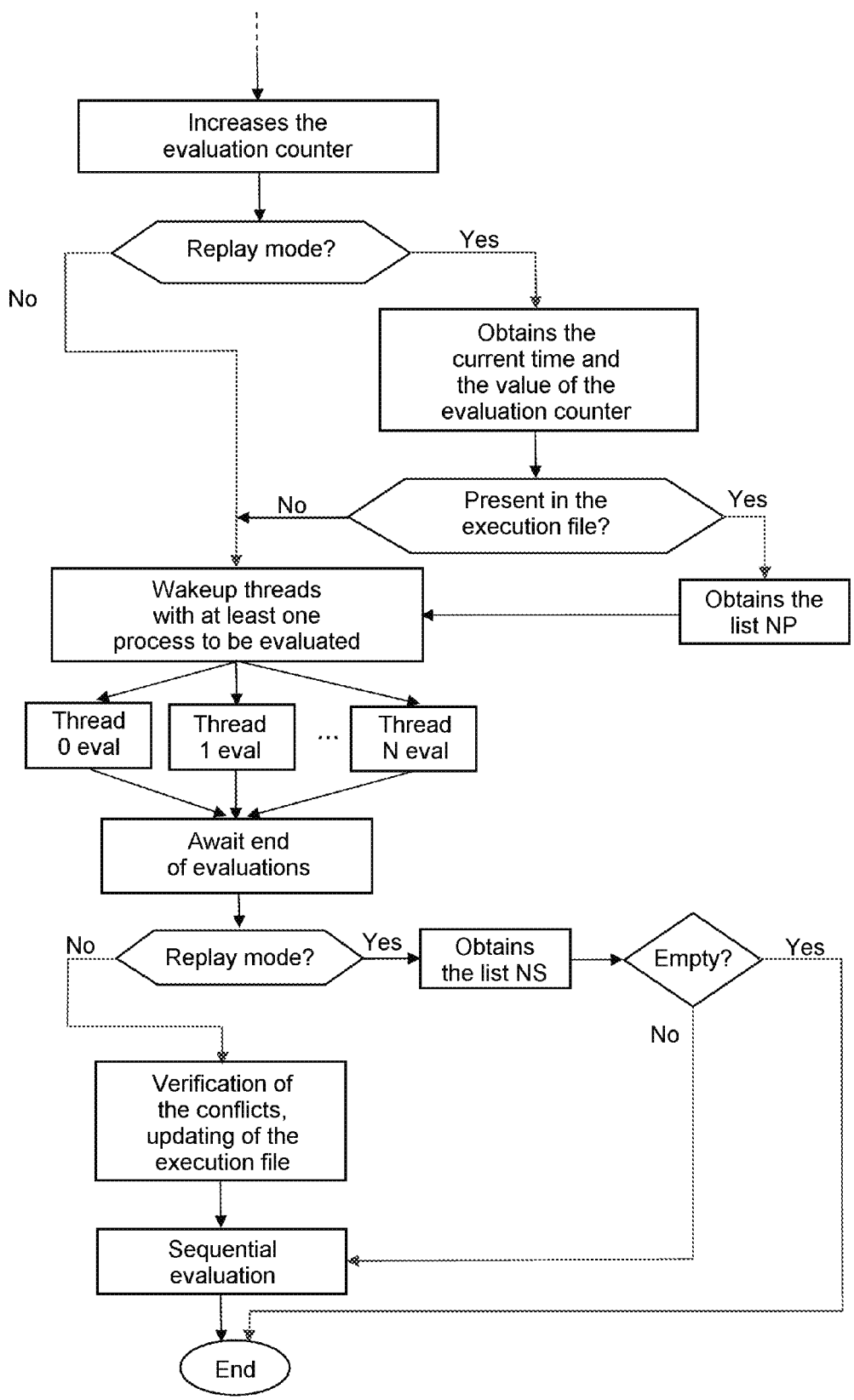
FIG. 7, a flow diagram of a method according to another embodiment of the invention, allowing the deterministic reproduction of a parallel simulation.

The flow diagram of FIG. 7 illustrates the progress of the evaluation phase according to an embodiment of the invention, including the possibility of "replaying" a simulation already performed. At the start of each evaluation phase, a counter is incremented. If the simulation has to be performed in "replay" mode, the kernel checks the present execution time and the value of the counter correspond to information recorded in the execution file. In the affirmative, the list NP of the threads that can be executed in parallel at the time and for the evaluation phase concerned is extracted from the file. These threads are then executed in parallel. Next, if the simulation should not be performed in "replay" mode, the method proceeds to the detection of the access conflicts and to the updating of the execution file. In "replay" mode, this step is not necessary, and the method simply proceeds to the extraction of the list NS from said file. Next, in both cases, the threads of said list are evaluated sequentially.

The simulation is terminated in case of detection of a conflict, if the scheduling listing "replay" mode is empty or after the end of the sequential evaluation.

The invention has been described in relation to particular embodiments, but many variants can be envisaged. In particular, several optimizations are possible. For example:

In order to improve the performance levels, parallel creations of graphs can be performed; that is made possible by a partitioning of the memory space into blocks, which makes it possible to access, create and modify the structures of graphs in parallel by addressing blocks and to then merge them in the detection phase, for example with a merging tree.

It is possible to previously declare the memory spaces as read only to avoid monitoring these addresses. The reduction of the space to be monitored can make it possible to significantly improve the performance levels.

It is possible to add the first level of nodes of each dependency graph (respectively the last) in the list of the threads that can be executed in parallel if, in a deterministic repeat execution, the parallel evaluation phase is evaluated before (respectively after) the sequential phase.

It is not essential to stop the simulation as soon as an access conflict is detected, although that is generally preferable.

BIBLIOGRAPHY

[MOY13] M. Moy, Parallel Programming with SystemC for Loosely Timed Models: A Non-Intrusive Approach, DATE 2013.

[CHEN12] W. Chen, X. Han and R. Dömer, "Out-of-order Parallel Simulation for ESL Design", in DATE 2012.

[MELL10] A. Mello, I. Maia, A. Greiner, and F. Pecheux, *Parallel Simulation of SystemC TLM 2.0 Compliant MPSoC on SMP Workstations*, DATE 2010.

[SCHU13] C. Schumacher et al., legaSCi: Legacy SystemC Model Integration into Parallel SystemC Simulators, IPDPSW 2013.

[EZUD09] P. Ezudheen et al., *Parallelizing SystemC kernel for fast hardware simulation on SMP machines*, PADS 2009.

[BLAN08] N. Blanc and D. Kroening, *Race Analysis for SystemC using model checking*, In IEEE/ACM International Conference on Computer-Aided Design (ICCAD), Piscataway, USA, 2008, pp. 356-363.

[HELM06] C. Helmstetter, F. Maraninchi, L. Maillet-Contoz and M. Moy, *Automatic generation of schedulings for improving the test coverage of systems-on-a-chip*, In Formal Methods in Computer Aided-Design (FMCAD), Washington, D.C., USA, 2006, pp. 171-178.

[SEN08] A. Sen, V. Ogale and M. S. Abadir, *Predictive run-time verification of multiprocessor SoCs in SystemC*, In DAC, New York, USA, 2008, pp. 948-953.

[LE14] H. M. Le and R. Drechsler, *Towards Verifying Determinism of SystemC Designs*, in DATE, March 2014.

[SCHU12a] C. Schumacher, J. H. Weinstock, R. Leupers and G. Ascheid, *SCANDAL: SystemC analysis for non-deterministic anomalies*, in Forum on Specification and Design Languages (FDL), Vienna, Austria, 2012.

[HERR06] F. Herrera and E. Villar, Extension of the SystemC kernel for simulation coverage, In Forum on Specification and Design Languages (FDL), 2006, pp. 161-168.

[SCHU10] C. Schumacher, R. Leupers, D. Petras and A. Hoffmann "parSC: Synchronous Parallel SystemC Simulation on Multi-Core Host Architectures", in CODES+ISSS, pages 241-246, Scottsdale, Ariz., USA, October 2010.

[CHU14] M.-K. Chung, J.-K. Kim, and S. Ryu "SimParallel: A High Performance Parallel SystemC Simulator Using Hierarchical Multi-threading", in International Symposium on Circuits and Systems (ISCAS), Melbourne, Australia, June 2014.

The invention claimed is:

1. An electronic system-level parallel simulation method implemented by means of a multi-core computer system, said method comprising the parallel evaluation of a plurality of concurrent processes of said simulation on a plurality of logic cores of said computer system, said concurrent processes being grouped together in threads, the concurrent processes of a same thread being evaluated sequentially by a same logic core of the system, the method comprising a sub-method of detection of conflicts of access, by said concurrent processes, to a shared memory of a simulated electronic system, said sub-method being implemented by a simulation kernel executed by said computer system and comprising, a step of construction of an oriented graph representative of access to said shared memory by said concurrent processes; and a step of detection of cycles in said graph;

a cycle being representative of a conflict of access to said shared memory;

wherein said oriented graph comprises nodes, each representing a thread accessing a location of said shared memory, and arcs each linking two nodes, each arc representing a relationship of order of execution between said threads for said two nodes.

2. The method as claimed in claim 1, comprising a plurality of concurrent process evaluation phases corresponding to successive simulation times, wherein said steps of the sub-method of detection of conflicts of access are implemented after each said evaluation phase.

3. The method as claimed in claim 1, also comprising:

in said parallel evaluation of a plurality of concurrent processes, a step of monitoring of at least one zone of said shared memory of the simulated electronic system previously declared as critical, and of preemption of all the processes belonging to a same thread as a process having tried to access said or each said zone after a first access by another process belonging to another thread; and after said parallel evaluation, a step of sequential evaluation of the processes preempted in the preceding step.

4. The method as claimed in claim 1, wherein said step of construction of an oriented graph comprises:

constructing a plurality of partial oriented graphs, each representative of access to a subset of said shared memory; and merging the plurality of partial oriented graphs to form an oriented graph representative of access to said shared memory by said concurrent processes.

5. The method as claimed in claim 4, wherein said shared memory of the simulated electronic system comprises a plurality of memory locations grouped together in a plurality of pages.

6. The method as claimed in claim 4, wherein the constructing of each of the plurality of partial oriented graph comprises:

on each read mode access to said subset of the shared memory, identifying and memorizing an identifier of a thread whose process has performed said read mode access;

on each write mode access, creating:

a current node, representing the thread whose process has performed said write mode access, preceding reading nodes, representing threads of which at least one process has performed a read mode access to said subset of the shared memory before said write mode access but after a possible preceding write mode access, if at least one such thread exist, oriented arcs each linking a preceding reading node to a current node, if at least one such node exists; and if the write mode access is not a first write mode access:

oriented arcs linking a preceding writing node, representing a thread of which a process has performed an immediately preceding write mode access to said preceding reading nodes, if at least one such node exists;

or an arc linking said writing node to said current node if no said preceding reading node exists.

7. The method as claimed in claim 6, wherein memorizing the identifier of the thread of which a process has performed said read mode access is performed by means of at least one vector associated with each thread, each said vector comprising as many Boolean elements as there are subsets of said shared memory, each element:

being associated with one said subset, having a first default binary value and taking a second binary value, opposite a preceding first default binary value, when a process belonging to said thread performs an access to the subset of said shared memory associated with said element.

8. The method as claimed in claim 1, wherein said access conflict detection sub-method also comprises, if no conflict is detected, determining an ordered first list of threads that have to be evaluated sequentially, and of a second list of threads that can be evaluated in parallel, implemented by linearization of said oriented graph.

9. The method as claimed in claim 8, further comprising a repeat execution of said simulation, said repeat execution comprising:

a phase of parallel evaluation of the threads belonging to said second list; and a phase of sequential evaluation of the threads belonging to said first list.

10. A non-transitory computer-readable storage medium storing a computer-executable computer code, the code when executed by a processor performs a method as claimed in claim 1.

* * * * *